United States Patent
Baker et al.

(10) Patent No.: US 6,567,075 B1
(45) Date of Patent: May 20, 2003

(54) FEATURE ACCESS CONTROL IN A DISPLAY-BASED TERMINAL ENVIRONMENT

(75) Inventors: Albert D. Baker, Lincroft, NJ (US); Christine Cook, Winchester (GB); James Cheng-ping Liu, Holmdel, NJ (US); Stephen M. Milton, Freehold, NJ (US); David Graham Neale, Southampton (GB)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/272,957

(22) Filed: Mar. 19, 1999

(51) Int. Cl.[7] .................................................. G06F 3/14
(52) U.S. Cl. ........................ 345/172; 345/168; 345/169; 345/744; 345/173; 345/840
(58) Field of Search ................................. 345/168, 169, 345/744, 172, 173, 733, 745, 840, 811, 825, 826, 827; 379/201, 202, 93.17, 93.19, 93.25

(56) References Cited

U.S. PATENT DOCUMENTS

| | | | | |
|---|---|---|---|---|
| 5,386,459 A | * | 1/1995 | Veeneman et al. | 379/93 |
| 5,425,077 A | * | 6/1995 | Tsoi | 455/566 |
| 5,615,257 A | * | 3/1997 | Pezzullo et al. | 379/396 |
| 5,956,655 A | * | 9/1999 | Suzuki et al. | 345/169 |
| 5,999,827 A | * | 12/1999 | Sudo et al. | 455/564 |

OTHER PUBLICATIONS

DEFINITY® Enterprise Communications Server, Release 6, Administration and Feature Description, "Bridged Call Appearance," pp. 4–109 to 4–124, Aug. 1997.
DEFINITY® Enterprise Communications Server, Release 6, Administration and Feature Description, "Terminal Translation Initialization," pp. 4–562 to 4–569, Aug. 1997.

* cited by examiner

Primary Examiner—Kristine Kincaid
Assistant Examiner—Thomas T. Nguyen
(74) Attorney, Agent, or Firm—Ryan, Mason & Lewis, LLP

(57) ABSTRACT

Feature access control is provided for soft-labeled keys (SLKs) of a wireless terminal or other type of terminal in a communication system. In an illustrative embodiment, a different set of SLK label identifiers are associated in a control table with each state in a set of states of the terminal. Each of the label identifiers specifies a label to be associated with a given one of the SLKs in a given one of the states. The label identifiers are used as pointers into a label table which specifies, for each of the label identifiers, a corresponding label for one of the SLKs. The control table and label table together implement a bidirectional mapping between single switch-based features and corresponding multiple state-based appearances of those features on the terminal. The control table and label table may be downloaded into the terminal from a switch of the system. The SLK labels of the terminal may be updated by, e.g., transmitting to the terminal a state identifier, an identifier of a most-recently activated feature, and a presentation attribute for that feature.

20 Claims, 7 Drawing Sheets

FIG. 5

| CURRENT SID | SLK NO. | SLK LABEL | SYSTEM BUTTON ID | NEW SID | ACTIVITY LIST |
|---|---|---|---|---|---|
| 1 | 1 | "1A" | 11 | 2 | |
| | 2 | "1B" | 12 | 3 | |
| | 3 | "1C" | 13 | 4 | |
| | 4 | "1D" | 14 | 5 | |
| 2 | 1 | | | | |
| | 2 | | | | |
| | 3 | | | | |
| | 4 | | | | |
| 3 | 1 | | | | |
| | 2 | | | | |
| | 3 | | | | |
| | 4 | | | | |
| 4 | 1 | | | | |
| | 2 | | | | |
| | 3 | | | | |
| | 4 | | | | |
| 5 | 1 | | | | |
| | 2 | | | | |
| | 3 | | | | |
| | 4 | | | | |

*FIG. 6A*

| CURRENT SID | SLK NO. | SLK LABEL | SYSTEM BUTTON ID | NEXT (NEW)SID | ACTIVITY LIST |
|---|---|---|---|---|---|
| ANY | INCOMING CALL OR [LINE] BUTTON | ANY | ANY | 2a | |
| 1a (HOME) | 1 | DIR | 20 | 6a | |
| | 2 | REDIAL | 21 | 2a | |
| | 3 | SAC | 22 | 1a | INVERSE VIDEO ICON (REDIR) |
| | 4 | <more> | - | 1b | |
| 1b (FEATURE STATE) | 1 | f1 | - | | |
| | 2 | f2 | - | | |
| | 3 | f3 | - | | |
| | 4 | <more> | - | 1c | |
| 1c (FEATURE STATE) | 1 | f4 | - | | |
| | 2 | f5 | - | | |
| | 3 | LOCAL | - | | |
| | 4 | <more> | - | 1a | |
| 2a (OFFHOOK STATE) | 1 | CONF | 3 | 3a | PRESS HARD BUTTONS {CAs} AND INCOMING CALL WILL LEAD INTO THIS SID |
| | 2 | TRANS | 4 | 4a | |
| | 3 | HOLD | 5 | 5a | |
| | 4 | <more> | - | 2b | |
| 2b (FEATURE STATE) | 1 | f6 | - | | |
| | 2 | f7 | - | | |
| | 3 | f8 | - | | |
| | 4 | <more> | - | 2c | |
| 2c (FEATURE STATE) | 1 | f9 | - | | |
| | 2 | f10 | - | | |
| | 3 | f11 | - | | |
| | 4 | <more> | - | 2a | |
| 3a (CONF STATE) | 1 | DROP | 2 | 3a | 2:2 OR LESS PARTIES IN CALL 3:3 OR MORE PARTIES IN CALL |
| | 2 | ADD | 3 | 3a/7a | GOTO STATE 7a WHEN MORE THAN 6 PARTIES IN THE CONFERENCE CALL |
| | 3 | HOLD | 5 | 5a | |
| | 4 | <more> | - | 3b | |
| 3b (FEATURE STATE) | 1 | f12 | - | | |
| | 2 | f13 | - | | |
| | 3 | f14 | - | | |
| | 4 | <more> | - | 3c | |

FIG. 6B

| | | | | | |
|---|---|---|---|---|---|
| 3c (FEATURE STATE) | 1 | f15 | – | | |
| | 2 | f16 | – | | |
| | 3 | f17 | – | | |
| | 4 | <more> | – | 3a | |
| 4a (TRANS STATE) | 1 | TRANS | 4 | 1a | |
| | 2 | EXIT/NORMAL | 13 | 2a | |
| | 3 | {blank} | – | | |
| | 4 | <more> | – | 4b | |
| 4b (FEATURE STATE) | 1 | f18 | – | | |
| | 2 | f19 | – | | |
| | 3 | f20 | – | | |
| | 4 | <more> | – | 4c | |
| 4c (FEATURE STATE) | 1 | f21 | – | | |
| | 2 | f22 | – | | |
| | 3 | f23 | – | | |
| | 4 | <more> | – | 4a | |
| 5a (HOLD STATE) | 1 | CONF | 3 | 3a | PRESS HARD BUTTONS {CAs} WILL LEAD TO SID:2 |
| | 2 | TRANS | 4 | 4a | |
| | 3 | {blank} | – | – | |
| | 4 | <more> | – | 5b | |
| 5b (FEATURE STATE) | 1 | f24 | – | | |
| | 2 | f25 | – | | |
| | 3 | f26 | – | | |
| | 4 | <more> | – | 5c | |
| 5c (FEATURE STATE) | 1 | f27 | – | | |
| | 2 | f28 | – | | |
| | 3 | f29 | – | | |
| | 4 | <more> | – | 5a | |
| 6a (DIR STATE) | 1 | NEXT | 11 | 6a | |
| | 2 | CDISP | 12 | 2a | |
| | 3 | EXIT/NORMAL | 13 | 1a | SET SYSTEM LINK TIMER (15 sec) AT SWITCH BEFORE TEARING DOWN THE RADIO LINK |
| | 4 | {blank} | – | – | |
| 7a (CONF MAX STATE) | 1 | DROP | 2 | 3a | 2:2 OR LESS PARTIES IN CALL 3:3 OR MORE PARTIES IN CALL |
| | 2 | {blank} | – | – | DON'T SHOW THE ADD LABEL WHEN MORE THAN 6 PARTIES IN THE CONFERENCE CALL |
| | 3 | HOLD | 5 | 5a | |
| | 4 | <more> | – | 3b | |

FIG. 7

| CONTROL TABLE DOWNLOAD | |
|---|---|
| STATE_ID | OCTET 4 |
| LID 1 | OCTET 5 |
| LID 2 | OCTET 6 |
| ⋮ | ⋮ |
| LID $n$ | OCTET $n+4$ |

FIG. 8

| LABEL TABLE DOWNLOAD | | | | | | | | |
|---|---|---|---|---|---|---|---|---|
| BITS: | | | | | | | | |
| 8 | 7 | 6 | 5 | 4 | 3 | 2 | 1 | |
| LID $n$ | | | | | | | | OCTET 4 |
| SBID | | | | | | | | OCTET 5 |
| $Ln$_CHAR1 | | | | | | | | OCTET 6 |
| $Ln$_CHAR2 | | | | | | | | OCTET 7 |
| $Ln$_CHAR3 | | | | | | | | OCTET 8 |
| $Ln$_CHAR4 | | | | | | | | OCTET 9 |

FEATURE ACCESS CONTROL IN A DISPLAY-BASED TERMINAL ENVIRONMENT

RELATED APPLICATIONS

The present application is related to U.S. patent application Ser. No. 09/272,955 entitled "Automated Administration System for State-Based Control of a Terminal User Interface," and U.S. patent application Ser. No. 09/272,956 entitled "State-Based Control of a Terminal User Interface Containing Soft-Labeled Keys," both filed concurrently herewith.

FIELD OF THE INVENTION

The invention relates generally to communication systems, and more particularly to communication systems which support wireless mobile telephones or other types of user terminals which include soft-labeled keys (SLKs).

BACKGROUND OF THE INVENTION

Conventional communication systems may be configured to support wireless terminals which utilize SLKs. The functions associated with such keys can be varied under control of a system switch or switch adjunct, such that the same physical key can represent multiple features at different times. This compensates for the typical lack of user interface "real estate" on the wireless terminal by providing full feature access even with many fewer physical keys than, e.g., a corresponding wired terminal supported by the same system. A wireless terminal which incorporates SLKs generally includes a display containing the labels associated with the SLKs. In a conventional premises switching system, updates of these labels are typically explicitly controlled by the switch, e.g., based on predetermined functional modes associated with an operating context of the wireless terminal, and/or in response to commands entered by a user at the wireless terminal.

A significant problem with providing such a context-sensitive soft-labeled wireless terminal is that a number of run time misoperations or service degradations can occur if conventional command and update strategies are used to drive the wireless terminal. For example, if the system switch provides updates on a per-key-depression basis, the switch expends a considerable portion of its processing capacity in simply updating the label context of the SLKs on the wireless terminal. This is undesirable since it reduces system capacity, and since it introduces potentially unacceptable delays in updating the key labels. The latter difficulty may also lead to an interpretative misoperation. For example, assume the user depresses multiple SLKs at the wireless terminal. As a result, the switch sends a collection of updates to the terminal, and the first SLK update is processed and displayed. However, if the user then depresses another one of the SLKs, the switch has no way of knowing if all of the updates have been processed at the terminal, and therefore must impose interpretive assumptions about the terminal labels being displayed at the point in time when an SLK is depressed. This is an undesirable interpretive race condition, since the switch is mapping terminal button identifiers to system feature codes and the identifiers and codes may be desynchronized. Another problem associated with conventional control of SLKs is that a significant amount of bandwidth can be expended in the process of transmitting updates to the wireless terminal, thereby reducing the local radio access efficiency of the system.

Additional problems arise in conventional systems with regard to feature access control. The SLK display line in a terminal of such a system will generally present those features that are of the most use to the user in any given context. This in turn requires that the same area of the display present different features at different times, and in different contexts. For example, a terminal in an IDLE condition would have no use for a call management feature such as HOLD, while a feature such as a directory service would be of value. Therefore, the display must provide different SLK labels during different conditions. Also note that, depending on the service mode, the same system feature may be required in numerous contexts. For example, the HOLD feature may be of value during any incoming or outgoing call, and may also be of value during conferencing and transferring operations. This being the case, the HOLD feature will have four occurrences in a dynamically changing feature mix presented to the user via the SLKs. Conventional techniques are generally unable to provide efficient control of feature access. Such techniques may require an excessive number of multiple update transmissions from the serving switch to the terminal, thereby increasing the bandwidth required to support the terminal user interface.

A need therefore exists for techniques which allow a communication system switch to control SLKs of a wireless terminal user interface in a more efficient manner, while avoiding the run time misoperations and other problems associated with conventional techniques.

SUMMARY OF THE INVENTION

The invention provides feature access control in a terminal of a communication system by creating a bidirectional mapping between single switch-based features and multiple state-based appearances of those features on the terminal. In an illustrative embodiment of the invention, feature access control is provided for soft-labeled keys (SLKs) of a wireless terminal using a control table and a label table. The control table associates a different set of SLK label identifiers with each state in a set of states of the terminal. The label identifiers of the control table are used as pointers into the label table which specifies, for each of the label identifiers, a corresponding label for one of the SLKs. For example, the label table may specify, for each of the labels identified by a given one of the label identifiers, a character string corresponding to the label, a feature identifier associated with the label, and a presentation attribute. The control table and label table together implement the above-noted bidirectional mapping between single switch-based features and corresponding state-based multiple appearances of labels identifying those features on the terminal. The control table and label table may be downloaded into the terminal from a switch of the system. The labels of the SLKs may be updated by, e.g., transmitting to the terminal a state identifier, an identifier of a most-recently activated feature, and a presentation attribute for that feature. The feature access control may be implemented in a system which utilizes a downloadable state-based control model to control SLKs on the terminal.

The feature access control of the invention provides a number of advantages over conventional systems. For example, the invention in the illustrative embodiment provides a bidirectional mapping, i.e., a one-to-many and many-to-one mapping, between single instances of switch features being represented as multiple instances of terminal features. A single point of update is provided for all instances of a label string corresponding to a given switch feature which is accessed from multiple states in the terminal, and a single point of storage is provided for all SLK label character strings, such that each string is stored only once. The invention allows entire SLK display lines to be updated by transmitting simple pointers, rather than displayable text, such that bandwidth consumption is considerably reduced. These and other features and advantages of the present invention will become more apparent from the accompanying drawings and the following detailed description.

BRIEF DESCRIPTION OF THE DRAWINGS

FIG. 5 shows a portion of a state transition table in accordance with the invention.

FIGS. 6A and 6B show a more detailed example of a state transition table in accordance with the invention.

FIGS. 7 and 8 show a control table and a label table, respectively, for implementing feature access control in an illustrative embodiment of the invention.

DETAILED DESCRIPTION OF THE INVENTION

The invention will be illustrated below in conjunction with an exemplary wireless communication system. Although particularly well-suited for use with, e.g., a telephone system which supports both wired deskset terminals and wireless terminals, the invention is not limited to use with any particular type of system or terminal. The disclosed techniques may be used in any communication application in which it is desirable to control terminal state in a processing-efficient and bandwidth-efficient manner. For example, the invention may be applied to handsets for use in cellular and personal communication services (PCS) systems, and to other types of communication terminals, such as wired ISDN terminals. The word "terminal" as used herein should therefore be understood to include not only portable wireless handsets as in the illustrative embodiment, but also other types of communication devices, including personal computers, wired and wireless desksets, optical communication terminals, or any terminal supported by a message-oriented command structure. It should be noted that the invention does not require any particular type of information transport medium, i.e., the invention may be implemented with any desired transport type. The term "switch" as used herein should be understood to include enterprise switches and other types of telecommunication switches, as well as other types of processor-based communication control devices such as servers, computers, adjuncts, etc. The term "table" as used herein is intended to include not only tabular representations as in the illustrative embodiments, but any other type and arrangement of data from which information can be extracted using one or more identifiers. Information stored in an addressable memory is an example of one type of table that may be used in conjunction with the invention. The term "label" as used herein is intended to include text, graphics or other types of user-perceptible information, as well as various combinations thereof. A character string is an example of one type of label that may be used in conjunction with the invention.

Figure 1:
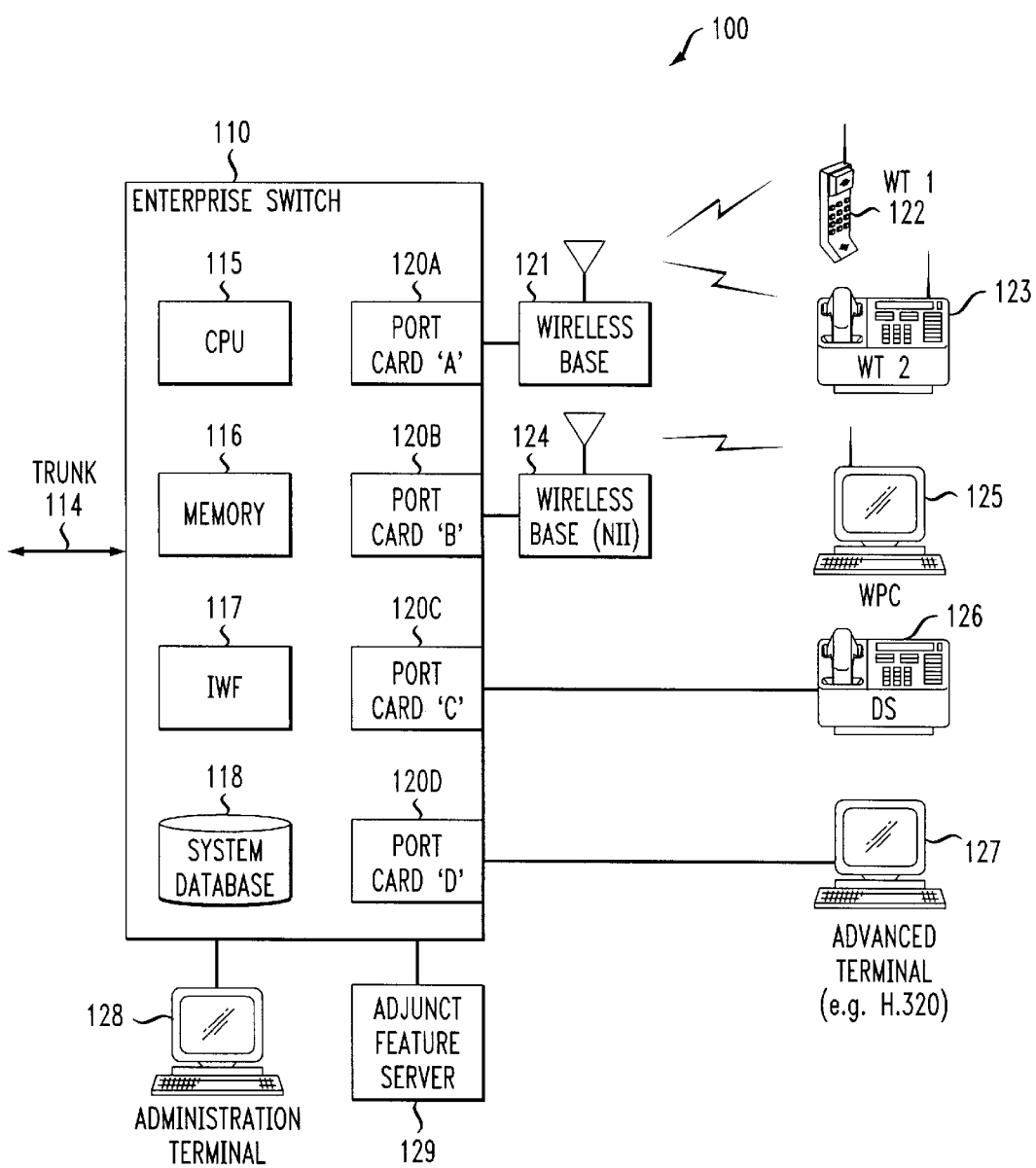
FIG. 1 shows a portion of an exemplary communication system in which the invention may be implemented.

FIG. 1 shows a portion of an exemplary communication system 100 in which the invention may be implemented. The system 100 includes an enterprise switch 110 which receives as an input a trunk 114. The trunk 114 supplies incoming calls to the switch 110 for processing. The switch 110 in this embodiment includes a central processing unit (CPU) 115, a memory 116, at least one interworking function (IWF) 117, and a system database 118. The CPU 115 may be a microprocessor, an application-specific integrated circuit (ASIC) or other type of digital data processor, as well as various portions or combination of such elements. The memory 116 may be a random access memory (RAM), a read-only memory (ROM) or combinations of these and other types of electronic memory devices.

The IWF 117 is used to provide necessary format conversions pertaining to signaling and transport, in a known manner. The IWF 117 may in other embodiments be incorporated into other elements of switch 110, such as the CPU 115 and memory 116. The system database 118 may be used to store, e.g., feature assignments to particular feature buttons, directory number assignments to corresponding call appearances or direct facility termination keys, access restrictions, and other known administrative information regarding the configuration of the system 100, as well as other types of information.

The switch 110 in this example further includes four port cards 120A, 120B, 120C and 120D. Port card 120A is coupled to a wireless base station 121 which communicates with a first wireless terminal (WT) 122 designated WT1 and a second wireless terminal 123 designated WT2. The terminal WT1 may be a mobile telephone, and the terminal WT2 may be a wireless deskset. Port card 120B is connected to a broadband wireless base station, e.g., a National Information Infrastructure (NII) wireless base station 124, which communicates with a wireless personal computer (WPC) 125. Port card 120C is connected to a wired deskset (DS) 126. Port card 120D is connected to an advanced terminal (AT) 127, which may be, e.g., a video telephone operating in accordance with the H.320 standard. It should be noted that the switch 110 may include additional port cards, and may be connected to other types and arrangements of user terminals. The switch 110 is also connected to an administrator terminal 128 which may used to program the operation of the switch 110 during a system administration, e.g., an initial set-up and configuration of the system or a subsequent system-level or user-level reconfiguration.

The system 100 of FIG. 1 includes an adjunct feature server 129. The adjunct feature server 129 may be directly connected to the switch 110 or connected thereto over a network or other suitable transport medium. The adjunct feature server 129 may be used, e.g., to implement state control logic for use in maintaining or otherwise processing a state transition table in accordance with the invention. Although shown as separate from the switch in the embodiment of FIG. 1, an adjunct such as adjunct feature server 129 is considered to fall within the general definition of the term "switch" as given previously. Such an adjunct may be physically incorporated within the switch in other embodiments of the invention, and may be partially or completely implemented using other switch elements such as CPU 115 and memory 116.

Figure 2:
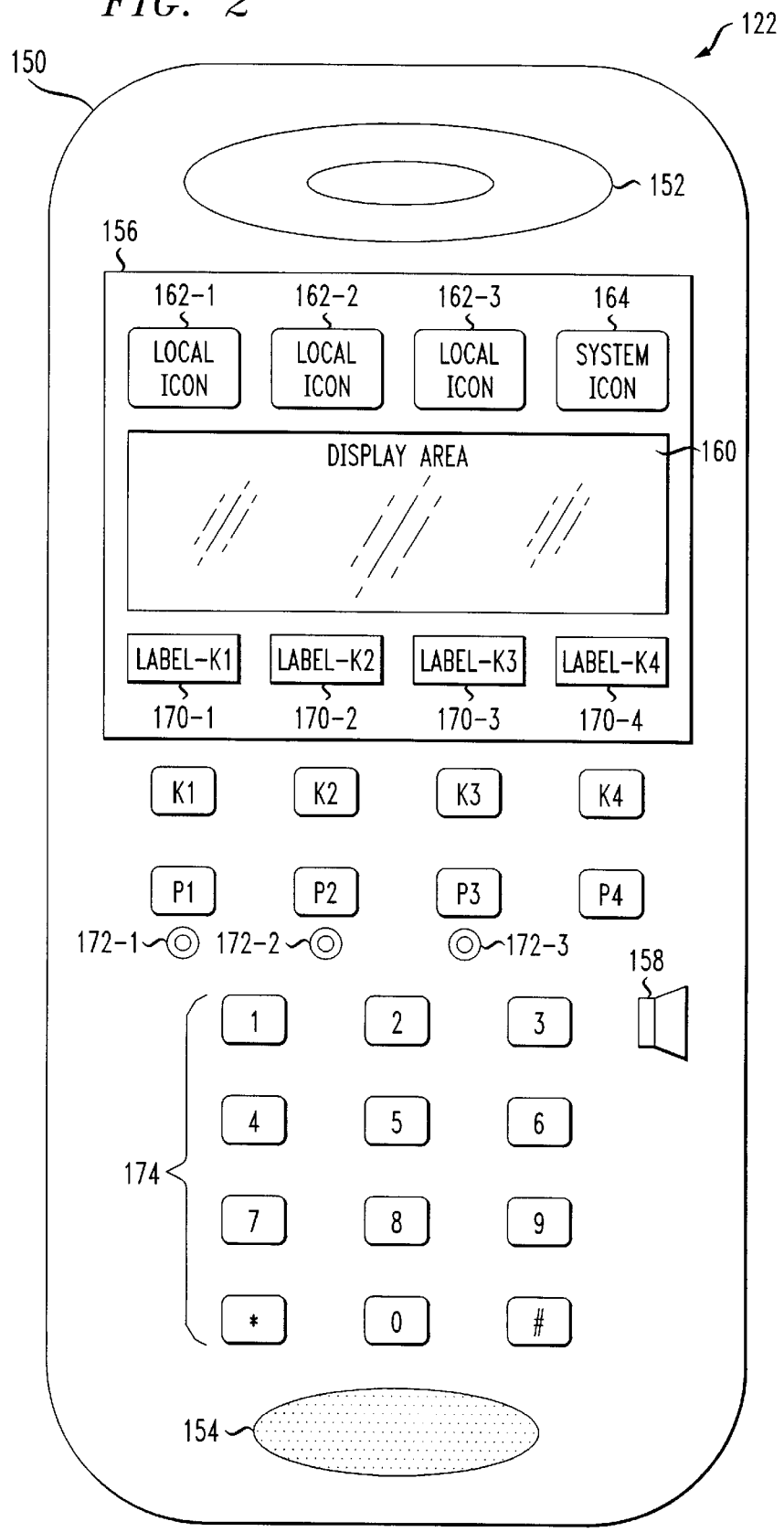
FIG. 2 shows an illustrative embodiment of a wireless terminal configured in accordance with the invention.

FIG. 2 shows a wireless terminal 122, which in the illustrative embodiment of the invention is configured to operate in accordance with a state-based control model. The terminal 122 includes a housing 150 with a speaker 152, a microphone 154, a display 156 and an audio alerter 158. The display 156, which may be an LCD display or other suitable type of display, includes a display area 160, a set of local icons 162-1, 162-2 and 162-3, a system icon 164, and a set of SLK labels 170-1, 170-2, 170-3 and 170-4 which indicate the functions associated with SLKs K1, K2, K3 and K4, respectively. A given physical SLK can have multiple function assignments which vary in accordance with the feature labels, based on the state-based control techniques of the invention to be described in greater detail below.

The local icons 162-1, 162-2 and 162-3 indicate locally-generated status information associated with the wireless terminal, e.g., battery charge remaining, signal strength, etc. The system icon 164 conveys system information supplied to the terminal by the switch. Alternative embodiments could include multiple switch-driven system icons. The wireless terminal 122 further includes buttons P1, P2, P3 and P4, LED indicators 172-1, 172-2 and 172-3, and a conventional set of touch-tone dialpad buttons 174. It should be emphasized that the configuration of wireless terminal 122 as shown in FIG. 2 is for purposes of illustration only, and should not be construed as limiting the invention to any particular type of terminal.

The present invention in an illustrative embodiment provides techniques for controlling the SLKs and their associated labels on the wireless terminal 122. In accordance with the illustrative embodiment of the invention, at least a portion of a user interface state machine is downloaded into the wireless terminal 122 by the switch 110 at, e.g., terminal registration time, and during system operation relieves the switch of much of the overhead associated with operating the wireless terminal interface. The state machine may be in the form of a state transition table or other suitable representation of state transition information. The state machine of the illustrative embodiment resolves update contention by providing local updates based on state, relieves system congestion by maintaining SLK updates locally in the wireless terminal, resolves interpretive race conditions by maintaining an explicit set of state-based button/label interpretation assignments locally in the wireless terminal, and reduces bandwidth consumption by either reducing or eliminating system updates to the wireless terminal interface.

In the illustrative embodiment, the switch can, e.g., re-download the state machine if terminal operation is interrupted for any reason, and/or can update the state machine each time the terminal registers with the switch. The responsibility for maintenance of the state machine may alternatively be implemented entirely within the terminal, or using an approach in which the responsibility is shared between the switch and the terminal. In the latter case, either the switch or the terminal may be designated as a master.

When the wireless terminal 122 is administered, e.g., at system startup, the system 100 creates a state table based on user needs as expressed in feature requirements declared in a station administration form, and based on system knowledge of feature operations. For example, when a conference feature is administered on the SLKs of the wireless terminal 122, a consequential state is created by the system. This state represents those events that are legitimate for the user after activating a conference function, e.g., add another member to the conference, drop a member from the conference, transfer, etc. The transition from the original SLK label screen to the consequential feature state is defined, and the results loaded in the state table. Other features are treated in a similar manner, resulting in the creation of a complete state table covering all of the desired features, and including access to local features.

During this process, feature identifiers that specify, e.g., the system code to access an associated feature, are inserted as data in the state table. These system-based feature identifiers are also referred to herein as system button identifiers (SBIDs). Note that SBIDs represent internal system identifiers for specific switch-based features. As noted previously, the table may also contain local feature identifiers. These local feature identifiers may be interleaved with the system feature identifiers. For example, as will be illustrated in conjunction with FIGS. 5, 6A and 6B, local features may be entered by way of an activity list specifying a subroutine, script, macro or other program to be executed if a user selects a particular SLK in a given state. This directs the terminal to go into a local mode, in which case some or all of its communication with the switch may be suspended. In the illustrative embodiment, when the system is activated and/or when the terminal registers with the switch, the state table is loaded into the wireless terminals. A copy of the table is generally also maintained in the serving switch.

At run time, when a given SLK is depressed, the wireless terminal sends the SBID associated with the currently-displayed label, and, assuming the state machine is locally controlled, updates its own display based on the next set of labels contained in its state table. In an embodiment in which the state machine is controlled by the switch, the wireless terminal may send to the switch an identifier of its current state as well as the SBID, and the switch returns an acknowledgment including an identifier of a new state. The wireless terminal then updates its display based on the next set of labels contained in its state table as specified by the new state identified in the acknowledgment.

Figure 3:
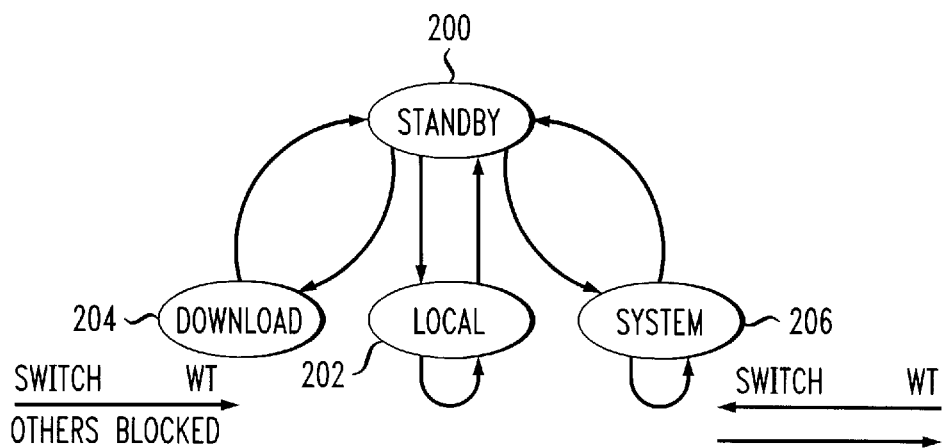
FIGS. 3 and 4 are diagrams illustrating the operating modes and state transitions, respectively, in the wireless terminal of FIG. 2 in accordance with the invention.
Figure 4:
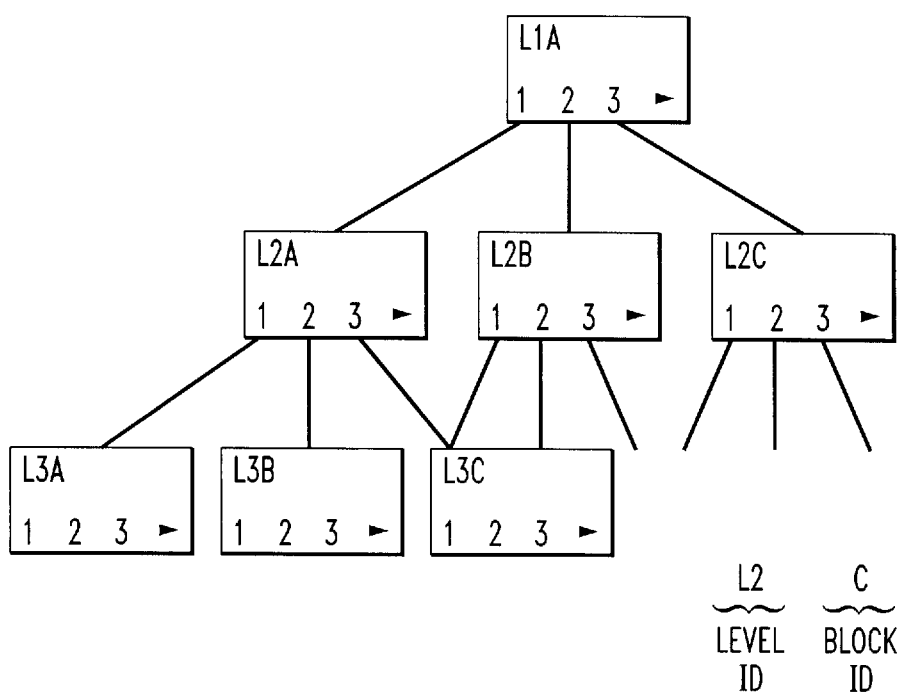

FIGS. 3 and 4 are diagrams illustrating the operating modes and state transitions, respectively, for providing the above-described SLK control in the wireless terminal of FIG. 2 in accordance with the invention. FIG. 3 illustrates the four general operating modes of the wireless terminal 122 relating to the SLK control of the invention. These four operating modes include, e.g., a transitory standby mode 200 in which the wireless terminal is not engaged in any particular activity; a local mode 202 in which the wireless terminal is being manipulated by the user for the purpose of local programming or local feature service; a download mode 204 in which the switch is downloading data into the wireless terminal; and a system mode 206, also referred to as a run-time mode, in which transport channel and feature service are available from the serving switch. In the download mode 204, communication is generally from the switch to the wireless terminal, with the uplink transport channel blocked but bidirectional signaling maintained for acknowledgments and the like, while in the system mode 206 full bidirectional communication between the switch and the wireless terminal is supported.

FIG. 4 shows a diagram in the form of a tree which illustrates state transitions in accordance with the invention. The nodes of the tree are in the form of blocks labeled L1A, L2A, L2B, etc. Each of these blocks corresponds to a particular set of SLK labels, in the general form of the labels 170-1, 170-2, 170-3 and 170-4 in FIG. 2. The first, second and third labels in each set are designated 1, 2 and 3, respectively. The fourth label in each set corresponds to a navigation function, and is designated with a "▶" character. The notation used to identify the nodes in the tree includes a level identifier Ln, where n is the particular level, and a block identifier A, B, C, etc. A given state in the state-based SLK control of the invention corresponds to a node of the tree, and thus a particular set of SLK labels as well as a set of control data, e.g., SBIDs, related to that set of labels. Navigation within the tree is such that pressing an SLK label 1, 2 or 3 results in movement down the corresponding branch to the next node of the tree, while pressing the "▶"

character results in movement to the right, i.e., to another segment of the same branch of the tree or to another branch of the tree, depending on the implementation. The movements from state to state within the tree are arranged in accordance with a specified state transition table. Transitions from a current state to the next state may be expressed as follows:

Current State+Transition (*SBID*)=Next State.

Note that correlating the state with a particular set of labels and SBIDs eliminates the previously-described race condition problem.

FIG. 5 shows a portion of a state transition table which may be used to implement the above-described state-based SLK control in accordance with the invention. The table, which is only partially populated in this example, includes a column for the current state identifier (SID), a column for SLK number, a column for SBID, a column for the new SID, and a column for an activity list. Associated with each of five possible current states in this example is a set of SLK labels, including a label for each of the four SLKs. For example, it can be seen from the FIG. 5 table that the SLKs 1, 2, 3 and 4 have been assigned labels 1A, 1B, 1C and 1D, respectively, in the state corresponding to SID 1. The table also includes an SBID for each of these assigned labels, i.e., SBIDs 11, 12, 13 and 14 for labels 1A, 1B, 1C and 1D. The new SID specifies the next state that the state-based control model moves to after the corresponding SLK is depressed by the user. The activity list may include additional relevant information for each entry, or may be eliminated in an alternative embodiment. As an example, the activity list may direct the terminal to enter a local mode and execute a preprogrammed local subroutine, script, macro or other program from a given state, after which the terminal returns to that state. The activity list may also direct the terminal to perform local functions such as memory updates, or attribute and condition adjustments.

FIGS. 6A and 6B show a more detailed example of a state transition table for controlling SLKs in a wireless terminal in accordance with the invention. This example assumes that the wireless terminal supports a total of seven primary states. These states are designated 1*a*, 2*a*, 3*a*, 4*a*, 5*a*, 6*a* and 7*a*. Primary states 1*a*, 2*a*, 3*a*, 4*a* and 5*a* each include two related states, designated Nb and Nc, where N is the primary state number. Each of the states provides a particular set of labels for four SLKs. For most of the states, three of the SLKs are used for functions or features, and one of the SLKs is used for navigation. The label indicating navigation in this example is the <more> label. The states and their corresponding sets of SLK labels in the example of FIGS. 6A and 6B are as follows:

1*a*. HOME State:
  Dir Redial SAC <more> | 1*b:* f1 f2 f3 <more> | 1*c:* f4 f5 local <more> |
2*a*. Offhook State:
  Conf Trans Hold <more> | 2*b:* f6 f7 f8 <more> | 2*c:* f9 f10 f11 <more> |
3*a*. Conference State:
  Drop Add Hold <more> | 3*b:* f12 f13 f14 <more> | 3*c:* f15 f16 f17 <more> |
4*a*. Transfer State:
  Trans Exit {blank} <more> | 4*b:* f18 f19 f20 <more> 4*c:* f21 f22 f23 <more> |
5*a*. Hold State:
  Conf Trans {blank} <more> | 5*b:* f24 f25 f26 <more> | 5*c:* f27 f28 f29 <more> |
6*a*. Directory State:
  Next Cdisp Exit {blank} |
7*a*. Conference Max State:
  Drop {blank} Hold <more> |

The set of SLK labels, SBIDs and transitions between the states are all specified in the state transition table of FIGS. 6A and 6B. The various system functions and features referred to in the state transition table, such as directory (Dir), send all calls (SAC), redial, conference (Conf), transfer (Trans), hold, call display (CDisp), etc. are well known in the art and will therefore not be described in detail herein. References to "hard buttons" for call appearances (CAs) refer generally to buttons such as P1, P2, P3 and P4 on wireless terminal 122 of FIG. 2.

The state transition table of FIGS. 6A and 6B allows the terminal to enter a local mode from state 1*c*, in which SLK No. 3, i.e., SLK K3 of FIG. 2, has a label "local." When the user depresses this key, the terminal enters a local mode and, e.g., executes a preprogrammed local subroutine, script, macro or other program. As previously noted, the activity list portion of the state transition table may include an identifier of the local action to be taken, e.g., an identifier of the local program to be executed, although such an identifier is not explicitly shown in the table of FIGS. 6A and 6B. Alternatively, such an identifier could be included in another column of the table, such as the SBID column. The state transition table could include any desired number and arrangement of local and switch feature labels. For example, a display line for a given state could include multiple local labels, intermixed with switch feature labels in any order. As another example, a given local program could be executed automatically upon entry into a particular state of the state transition table.

It should be noted that in the above-described illustrative embodiments, there are no interpretive race conditions, since system level feature identifiers, e.g., SBIDs, are transmitted to the switch explicitly based on current feature label contents. In addition, bandwidth consumption is greatly reduced, since the maximum response to given feature is a new state identifier, e.g., approximately one octet, compared to the dozens of octets of ASCII character strings typically associated with a display update in a conventional system. Furthermore, feature interpretation and display updates may be substantially eliminated for the system, since the feature identifiers sent by the wireless terminal to the switch do not need to be processed through a switch-based mapping function. Another advantage of the invention is that the SLK labels in the illustrative embodiment are fully language-independent, because there is a correspondence established between a character set in the terminal and the state transition table. This avoids the problems associated with preprogrammed labels, particularly language-related problems. It should be noted that, although illustrated using a wireless terminal, the invention can provide similar benefits in applications involving wired terminals.

Another aspect of the invention relates to providing feature access control using a bidirectional mapping function which allows single-occurrence features found on one terminal, e.g., a wired terminal such as terminal 126 of FIG. 1, to be represented multiple times on a different terminal which supports SLKs, e.g., a wireless terminal such as wireless terminal 122. This mapping function in accordance with the invention is implemented in an illustrative embodiment using two tables, a control table and a label table, which provide a set of interrelated pointers to execute the mapping function. The control table organizes groups of features into states, such as those described in conjunction with the state-based control aspects of the invention, and the label table stores label strings and associated attributes for each of the states.

FIGS. 7 and 8 show a control table and a label table, respectively, for implementing the above-noted feature access control in an illustrative embodiment of the invention. The control table as shown in FIG. 7 includes a state identifier STATE_ID and a list of label identifiers (LIDs) which serve as pointers to the associated SLK labels for that state. The STATE_ID and the LIDs are each represented by a single octet, in this embodiment octet 4 for the STATE_ID and octet n+4 for LID n. It is assumed for this embodiment that octets 1, 2 and 3 are dedicated to protocol control information normally associated with message-based signaling. Although the control table of FIG. 7 shows the set of LIDs for a single state, the control table will generally include similar information for other states, e.g., a list of LIDS for each state in a state transition table such as that described previously.

Each of the LIDs in the control table of FIG. 7 points to a specific set of information in the label table of FIG. 8. This set of information in the label table may include, for a given LID, a character string corresponding to a given label, and a feature identifier, e.g., an SBID, corresponding to the internal system code for a given feature. It should be noted that FIG. 8 shows an illustrative download format for the label table, e.g., the label table information which is downloaded from the switch at terminal registration or system startup. The label table as actually stored in the terminal may include additional information not shown in FIG. 8, such as a presentation attribute for the current presentation state, e.g., on, off, blink, etc. The SBID is included in the label table in this embodiment because it can be used as an index into the label table in order to update stored presentation attributes.

The label table provides a single point of update for multiple occurrences of a single SLK label string. In the FIG. 8 example, each string is assumed to include four characters each, e.g., four ASCII-based international characters, although other types and arrangements of characters could also be used. Note that the label table of FIG. 8 shows the information for a single label string, i.e., the label string for LID n. This information includes LID n, represented by octet 4, an associated SBID, represented by octet 5, and four characters Ln_CHAR1, Ln_CHAR2, Ln_CHAR3 and Ln_CHAR4, represented by octets 6, 7, 8 and 9, respectively. The label table may include similar information for all unique SLK label strings to be specified. For example, the SLK label string identified by LID 2 may be specified in octet 10, its corresponding SBID in octet 11, and its four characters in octets 12 through 15. The information for LIDs other than LID n is omitted from the FIG. 8 label table for simplicity and clarity of illustration. In the illustrative embodiment of the invention, the entire control table and entire label table may be downloaded to the terminal from the switch, but other arrangements are also possible.

In operation, entire display lines of SLKs, e.g., a set of four labels 170-1 through 170-4 in terminal 122 of FIG. 2, may be written to the terminal 122 by sending a new STATE_ID to that terminal, along with a presentation attribute and the SBID of the last feature activated, if applicable. The terminal then interprets the set of LIDs specified for that state in the control table by referencing the label table and extracting the character strings and presentation attributes associated with that set of LIDs. The terminal can thereby accurately represent both the labels and the condition, as defined by the presentation attribute, of the current SLK display line. A situation in which the presentation attribute and SBID of the last feature activated need not be sent is if the activation is due, e.g., to a switch-side occurrence, rather than in response to a feature access indication from the terminal. In this case, a new STATE_ID may be sent without updating the presentation attribute of the last feature activated.

The above-described feature access control aspect of the invention provides a number of advantages over conventional systems. For example, the invention in the illustrative embodiment provides a fully-resolved bidirectional mapping, i.e., a one-to-many and many-to-one mapping, between single instances of switch features being represented as multiple instances of terminal features. The mapping supports a single point of update for all instances of a label string corresponding to a given switch feature which is accessed from multiple states in the terminal, and a single point of storage for all SLK label character strings, such that each string is stored only once Entire SLK display lines can be updated by transmitting three short pointers, i.e., new STATE_ID, SBID of the most recently activated feature, and presentation attribute of that SBID, of one octet each instead of dozens of octets of displayable text as in a conventional system. This results in a considerable reduction in the bandwidth required to update SLK display lines.

The state-based control and/or feature access control in the illustrative embodiment may be implemented in whole or in part in a port card in the serving switch, e.g., in port card 120A associated with wireless base station 121 in system 100 of FIG. 1, elsewhere in the enterprise switch 110, e.g., using CPU 115 and memory 116, in the wireless terminal 122, in the adjunct feature server 129, or in various combinations of these and other system elements. Other suitable arrangements of hardware and/or software may be used to implement the state-based control process in accordance with the invention. The wireless terminal 122 includes suitable circuitry for receiving and decoding information received from the switch 110, and executing the corresponding commands. Such receiving, decoding and execution circuitry may include, e.g., a conventional processor and memory, and may be implemented in a straightforward manner. These and numerous other alternative embodiments within the scope of the following claims will be apparent to those skilled in the art.

What is claimed is:

1. A method of controlling a wireless terminal in a communication system, the method comprising the steps of:

associating a set of label identifiers for a plurality of soft-labeled keys of the terminal with one of a plurality of states of a state machine that controls the soft-labeled keys of the terminal, wherein each of the label identifiers specifies a label to be associated with a given one of the soft-labeled keys of the terminal in a given one of the states; and utilizing the label identifiers to generate a display including a set of labels for the plurality of soft-labeled keys;

wherein the associating step includes storing a control table specifying a set of label identifiers for each of at least a subset of the plurality of states of the state machine, the soft-labeled keys being controlled in accordance with the state machine with each of at least a subset of the states of the state machine having a corresponding entry in the control table and an associated set of label identifiers, the state machine being configured to run substantially in its entirety within the terminal, and wherein the utilizing step includes utilizing the set of label identifiers associated with a given one of the states to access a stored label table that specifies the corresponding set of labels, each of the label identifiers in the set of label identifiers associated with the control table entry for the given state serving as a pointer into the label table which specifies, for a given one of the label identifiers, a corresponding label for one of the soft-labeled keys in the given state, the label table thereby providing a single point of update for multiple occurrences of a particular label in the plurality of states.

2. The method of claim 1 wherein at least a subset of the label identifiers each specify a particular feature supported by the system.

3. The method of claim 1 wherein different sets of label identifiers are associated with each of the plurality of states of the terminal, and at least one of the label identifiers is associated with at least two of the states.

4. The method of claim 1 wherein at least a portion of the control table is downloaded to the terminal from a switch of the system.

5. The method of claim 1 wherein at least a portion of the label table is downloaded to the terminal from a switch of the system.

6. The method of claim 1 wherein the label table includes, for each of at least a subset of the labels identified by a given one of the label identifiers, a character string corresponding to the label, a feature identifier associated with the label, and a presentation attribute.

7. The method of claim 1 further including the step of receiving an identifier of the state from a switch of the system, and utilizing the state identifier to determine the set of labels for the display.

8. The method of claim 1 further including the step of updating the labels associated with the soft-labeled keys by transmitting to the terminal a state identifier, an identifier of a most-recently activated feature, and a presentation attribute for that feature.

9. The method of claim 1 wherein the states of the terminal are controlled in accordance with a state machine that specifies the states and transitions between the states.

10. An apparatus comprising:
a communication system wireless terminal operative to associate a set of label identifiers for a plurality of soft-labeled keys with one of a plurality of states of a state machine that controls the soft-labeled keys of the terminal, wherein each of the label identifiers specifies a label to be associated with a given one of the soft-labeled keys of the terminal in a given one of the states, such that the terminal utilizes the label identifiers to generate a display including a set of labels for the plurality of soft-labeled keys; wherein the terminal stores a control table specifying a set of label identifiers for each of at least a subset of the plurality of states of the state machine, the soft-labeled keys being controlled in accordance with the state machine with each of at least a subset of the states of the state machine having a corresponding entry in the control table and an associated set of label identifiers, the state machine being configured to run substantially in its entirety within the terminal, and wherein the terminal utilizes the set of label identifiers associated with a given one of the states to access a stored label table that specifies the corresponding set of labels, each of the label identifiers in the set of label identifiers associated with the control table entry for the given state serving as a pointer into the label table which specifies, for a given one of the label identifiers, a corresponding label for one of the soft-labeled keys in the given state, the label table thereby providing a single point of update for multiple occurrences of a particular label in the plurality of states.

11. The apparatus of claim 10 wherein at least a subset of the label identifiers each specify a particular feature supported by the system.

12. The apparatus of claim 10 wherein different sets of label identifiers are associated with each of the plurality of states of the terminal, and at least one of the label identifiers is associated with at least two of the states.

13. The apparatus of claim 10 wherein at least a portion of the control table is downloaded to the terminal from a switch of the system.

14. The apparatus of claim 10 wherein at least a portion of the label table is downloaded to the terminal from a switch of the system.

15. The apparatus of claim 10 wherein the label table includes, for each of at least a subset of the labels identified by a given one of the label identifiers, a character string corresponding to the label, a feature identifier associated with the label, and a presentation attribute.

16. The apparatus of claim 10 wherein the terminal is further operative to receive an identifier of the state from a switch of the system, and to utilize the state identifier to determine the set of labels for the display.

17. The apparatus of claim 10 further wherein the terminal is operative to receive, from a switch of the system, a state identifier, an identifier of a most-recently activated feature, and a presentation attribute for that feature.

18. The apparatus of claim 10 wherein the states of the terminal are controlled in accordance with a state machine that specifies the states and transitions between the states.

19. An apparatus comprising:
a communication system switch operative to associate a set of label identifiers for a plurality of soft-labeled keys with one of a plurality of states of a state machine that controls the soft-labeled keys of a wireless terminal of the system, wherein each of the label identifiers specifies a label to be associated with a given one of the soft-labeled keys of the terminal in a given one of the states, such that the terminal utilizes the label identifiers to generate a display including a set of labels for the plurality of soft-labeled keys;
wherein the terminal stores a control table specifying a set of label identifiers for each of at least a subset of the plurality of states of the state machine, the soft-labeled keys being controlled in accordance with the state machine with each of at least a subset of the states of the state machine having a corresponding entry in the control table and an associated set of label identifiers, the state machine being configured to run substantially in its entirety within the terminal, and wherein the terminal utilizes the set of label identifiers associated with a given one of the states to access a stored label table that specifies the corresponding set of labels, each of the label identifiers in the set of label identifiers associated with the control table entry for the given state serving as a pointer into the label table which specifies, for a given one of the label identifiers, a corresponding label for one of the soft-labeled keys in the given state, the label table thereby providing a single point of update for multiple occurrences of a particular label in the plurality of states.

20. An article of manufacture comprising:
a machine-readable storage medium storing one or more programs for implementing a method of controlling a wireless terminal in a communication system, wherein the one or more programs when executed associate a set of label identifiers for a plurality of soft-labeled keys in the terminal with one of a plurality of states of a state machine that controls the soft-labeled keys of the terminal, wherein each of the label identifiers specifies a label to be associated with a given one of the soft-labeled keys of the terminal in a given one of the states, such that the label identifiers may be utilized to generate a display including a set of labels for the plurality of soft-labeled keys;

wherein the terminal stores a control table specifying a set of label identifiers for each of at least a subset of the plurality of states of the state machine, the soft-labeled keys being controlled in accordance with the state machine with each of at least a subset of the states of the state machine having a corresponding entry in the control table and an associated set of label identifiers, the state machine being configured to run substantially in its entirety within the terminal, and wherein the terminal utilizes the set of label identifiers associated with a given one of the states to access a stored label table that specifies the corresponding set of labels, each of the label identifiers in the set of label identifiers associated with the control table entry for the given state serving as a pointer into the label table which specifies, for a given one of the label identifiers, a corresponding label for one of the soft-labeled keys in the given state, the label table thereby providing a single point of update for multiple occurrences of a particular label in the plurality of states.

* * * * *